United States Patent
Narayanan

(10) Patent No.: US 10,428,230 B2
(45) Date of Patent: *Oct. 1, 2019

(54) SYNERGISTIC MIXED SOLVENTS-BASED COMPOSITIONS WITH IMPROVED EFFICIENCY OF PERFORMANCE AND ENVIRONMENTAL SAFETY FOR REMOVAL OF PAINT, VARNISH AND STAIN

(71) Applicant: Kolazi S. Narayanan, Wayne, NJ (US)

(72) Inventor: Kolazi S. Narayanan, Wayne, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/659,783

(22) Filed: Jul. 26, 2017

(65) Prior Publication Data

US 2017/0327703 A1    Nov. 16, 2017

Related U.S. Application Data

(63) Continuation-in-part of application No. 14/885,996, filed on Oct. 17, 2015, and a continuation-in-part of application No. 14/805,332, filed on Jul. 21, 2015, now abandoned, and a continuation-in-part of application No. 14/830,436, filed on Aug. 19, 2015.

(51) Int. Cl.
| | |
|---|---|
| *C09D 9/00* | (2006.01) |
| *C09D 9/04* | (2006.01) |
| *C11D 3/43* | (2006.01) |
| *C11D 7/50* | (2006.01) |

(52) U.S. Cl.
CPC .............. *C09D 9/005* (2013.01); *C09D 9/04* (2013.01); *C11D 3/43* (2013.01); *C11D 7/5009* (2013.01); *C11D 7/5013* (2013.01); *C11D 7/5022* (2013.01)

(58) Field of Classification Search
CPC .................................. C09D 9/00; C09D 9/005
See application file for complete search history.

(56) References Cited

U.S. PATENT DOCUMENTS

| | | | | |
|---|---|---|---|---|
| 4,865,758 A * | 9/1989 | Caster | ............... | C09D 9/005 134/38 |
| 5,098,592 A * | 3/1992 | Narayanan | ............... | C09D 9/005 134/38 |
| 5,154,848 A * | 10/1992 | Narayanan | ............... | C09D 9/005 134/38 |
| 5,217,640 A * | 6/1993 | Narayanan | ............... | C09D 9/005 134/38 |
| 5,334,255 A * | 8/1994 | James | ............... | C08J 11/00 134/10 |
| 5,334,331 A * | 8/1994 | Fusiak | ............... | C09D 9/005 134/38 |
| 2002/0032138 A1* | 3/2002 | Lallier | ............... | C09D 9/00 510/201 |
| 2005/0202982 A1* | 9/2005 | Perlman | ............... | A61K 8/4973 510/118 |
| 2012/0046212 A1* | 2/2012 | Bourdette | ............... | C09D 9/04 510/206 |
| 2013/0145806 A1* | 6/2013 | Iannotta | ............... | C05G 3/08 71/27 |
| 2013/0274152 A1* | 10/2013 | Sehgal | ............... | C09K 8/64 507/211 |
| 2015/0252302 A1* | 9/2015 | Rieth | ............... | C11D 3/2072 514/772 |
| 2017/0107384 A1* | 4/2017 | Narayanan | ............... | C09D 9/005 |

FOREIGN PATENT DOCUMENTS

| | | | | |
|---|---|---|---|---|
| CH | 730228 A1 | * | 12/2011 | |
| WO | WO-2014047428 A1 | * | 3/2014 | .......... C11D 3/2072 |

* cited by examiner

Primary Examiner — Nicole M. Buie-Hatcher
Assistant Examiner — M. Reza Asdjodi
(74) Attorney, Agent, or Firm — Vorys, Sater, Seymour and Pease LLP; Elisabeth Rather Healey

(57) ABSTRACT

A composition which is particularly effective for removing paint or varnish from wood concrete or metal surfaces comprising synergistic mixed solvents-based compositions with Improved efficiency of performance and environmental safety. The mixed solvent compositions are made from about 10-90% by weight of each polar solvent selected from the group consisting of (pentanoic acid, 5-(dimethylamino)-4-methyl-5-oxo-methyl ester; propylene carbonate, N,N-dimethyl imidazolidinone, dimethyl sulfoxide, dimethyl acetamide, gamma butyrolactone, benzyl alcohol, and mixtures thereof and an activator, ethyl ethoxy propionate, and an aqueous system additive. Methods for use of the composition are also disclosed.

23 Claims, No Drawings

SYNERGISTIC MIXED SOLVENTS-BASED COMPOSITIONS WITH IMPROVED EFFICIENCY OF PERFORMANCE AND ENVIRONMENTAL SAFETY FOR REMOVAL OF PAINT, VARNISH AND STAIN

CROSS REFERENCE TO RELATED APPLICATIONS

This application is a continuation-in-part of U.S. patent application Ser. No. 14/885,996, filed Oct. 17, 2015, which, in turn, is a continuation-in-part of application Ser. No. 14/805,332, filed Jul. 21, 2015, entitled Mixed Solvent Based Compositions for Removal of Paint and Varnish and a continuation-in-part of U.S. patent application Ser. No. 14/830,436, filed Aug. 19, 2015, entitled Improved Synergistic Mixed Solvents-Based Compositions For Removal Of Paint, Varnish And Stain Coatings, the entire contents of each of which are hereby incorporated by reference.

BACKGROUND OF THE INVENTION

1. Field of the Invention

This invention relates to improving performance efficacy of non-aqueous paint and varnish remover compositions containing volatile components, and more particularly, by addition of pre-optimized solvent based compositions. Optimized solvent based compositions consist of mixed polar solvents and an activator. The activator can be either the volatile components or optionally lower boiling ethoxylated esters like ethoxy ethyl propionate (EEP). The pre-optimized compositions are described in application Ser. Nos. 14/885,996, 14/805,33b 2 and 14/830,436, referred to hereinabove.

There are several paint stripping compositions in commercial use containing high amounts of volatile solvents. As used herein, the term "volatile solvent" means a solvent having a boiling point of less than 90° C. at atmospheric pressure or a vapor pressure greater than 70 mm of mercury at 25° C.

Some examples are: Methylene Chloride, Methanol, Ethanol, Isopropanol, Acetone, Methylethyl Ketone, and aliphatic hydrocarbon containing up to six carbon atoms.

Although known paint stripping compositions containing high levels of volatile components greater than 40% and, in some cases, greater than 70% have cost advantages and are effective in removing paints and varnish, they have certain major disadvantages. These disadvantages include high inhalation toxicity for the users, the presence of suspect carcinogens, high flammability, deficiency of oxygen when used in low ventilated surroundings, and leakage via vapor loss from defective containers. In addition, the use of certain of these volatile compounds, e.g., methylene chloride, is highly regulated by environmental agencies around the world. These compounds also often exhibit redeposition of the removed paint from the substrate during the paint striping process requiring retreatment. This, in turn, requires the need for to use larger amounts of the volatile paint stripping compositions measured by weight of the formulation/unit area of the treated substrate compared to the use of compositions containing compounds having low volatility, i.e., a boiling point of greater than 90° C. at atmospheric pressure or a vapor pressure greater than 70 mm of mercury at 25° C. It is an object of this invention to reduce the exposure level and the effective use level of the volatile components by adding adequate amount of pre-optimized solvent based compositions. It is further object of this invention to provide a composition which achieves enhanced and improved paint removal characteristics compared to prior art paint removal compositions.

2. Description of the Prior Art

The term "varnish and paint removal" as applied herein refers to chemical compositions which can strip or facilitate stripping of coatings, such as, paint, varnish, lacquer, shellac, polyurethane finishes and enamels, used to protect substrates such as wood and metal and to beautify them. Methylene chloride paint strippers are currently the industry standard for stripper performance. Methylene chloride strippers are effective for quickly softening most types of paints. The speed at which methylene chloride performs is believed to be due to its high solvent power coupled with high volatility as reflected by its extremely fast evaporation rate. This high volatility shortens the work life of methylene chloride paint strippers. Frequently, when methylene chloride paint strippers are used on thick accumulations of paint, more than one application is required since the work life is insufficient to permit penetration through the accumulation of paint. Methylene chloride is a chlorinated solvent which is closely regulated for environmental protection. Recently, it was discovered that methylene chloride can cause tumors in rats and mice. Since that discovery, the wide use of that solvent by industry and consumers has come under close scrutiny by federal regulatory agencies. N-methyl-2-pyrrolidone (NMP) has been employed in place of methylene chloride as the active ingredient in paint stripper compositions. Nelson, in U.S. Pat. No. 4,759,510, (Incorporated herein by reference in its entirety) for example, described a composition for this use having low volatility which included about 20% to 90% by weight of NMP and 30% to 70% by weight of an aromatic hydrocarbon solvent.

Mixtures of NMP and gamma-butyrolactone (BLO) also have been used as liquid formulations for removing screen printing inks. Madsen, in U.S. Pat. No. 4,836,950 (Incorporated herein by reference in its entirety), for example, described a liquid composition which included 1-25% by volume of NMP and/or BLO. Valasek, similarly, in U.S. Pat. No. 4,664,721 (Incorporated herein by reference in its entirety), described a composition which included 30-85% by weight of NMP and 10-35% by weight of an oxygenated solvent selected from esters and ethers. BLO was mentioned as a suitable component (lactone), although butoxyethanol and cyclohexanone were preferred. Caster, in U.S. Pat. No. 4,865,758 (Incorporated herein by reference in its entirety) described a method of removing paint with a lower alkyl substituted 2-oxazolidinone. In comparative results reported therein, it was disclosed that ethyl 3-ethoxypropionate had no effect on paint removal. McCullins, in British 1,487,737, described a paint remover composition for aerosol type paints in the form of a gel which included methyl ethyl ketone, ethyl acetate, ethoxyethanol and 2-ethoxyethyl acetate. This mixture of solvents was considered effective for paint sprayed graffiti as a viscous, transparent gel containing particles of silica or alumina in suspension. Palmer, in U.S. Pat. No. 4,120,810, (Incorporated herein by reference in its entirety) described paint remover compositions of NMP and/or BLO, and at least 35 mole % of blends of alkyl naphthalenes and alkyl benzenes.

These and other compositions, however, have not proven particularly effective for removing paint and varnish from wood and metal surfaces, without containing objectionable halogenated or aromatic compounds.

Furthermore, they do not possess the attributes of being biodegradable, non-flammable, having a low vapor pressure and low toxicity.

Narayanan et al in U.S. Pat. No. 5,098,592 (Incorporated herein by reference in its entirety) (World patent No 5217640) have shown that a synergistic combination of NMP, BLO and ethyl 3-ethoxypropionate (EEP) is a very effective for removing varnish and several type of paints from wood and metal substrates. In Narayanan et al in U.S. Pat. No. 5,154,848 (Incorporated herein by reference in its entirety), a method is provided for removing or stripping varnish and paint from surfaces such a wood or metal which comprises applying a composition composed of NMP and/or BLO with about 1-30% by weight of an activator compound which is ethyl 3-ethoxypropionate (EEP) to the surface.

Fusiak in U.S. Pat. No. 5,334,331 (Incorporated herein by reference in its entirety) describes compositions of NMP/BLO and combinations activated by cyclomethacone at around 5% to remove organic coatings from substrates.

Fusiak et al in U.S. Pat. No. 5,049,300 (Incorporated herein by reference in its entirety) describes activation of NMP and combinations with acids Known art of solvent based compositions for removal of paint, varnish coatings are non-aqueous, essentially free from water.

Several water based cleaning and spray compositions use powerful wetting agents and spreading agents. See: Robert Login et al on NOP use in multipurpose applications described in, WP 88/00184, U.S. Pat. No. 5,294,644 (Incorporated herein by reference in its entirety) and U.S Pat. No. 5,093,031 (Incorporated herein by reference in its entirety). Narayanan et al on synergy between NOP and Silwett L 77 (ethoxylated silicone) described in U.S. Pat. No. 5,508,249 (Incorporated herein by reference in its entirety), Rosen et al synergy between NOP and Alcohol ethoxylate, in U.S. Pat. No. 7,264,885 (Incorporated herein by reference in its entirety) and Narayanan et al (water dilutable NOP, alcohol ethoxylate synergistic composition, Easy wet 20) in U.S. Pat. No. 6,967,190 which is incorporated herein by reference in its entirety. See also Machac, Jr. et al, U.S. Pat. No. 6,159,915, incorporated herein by reference which describe paint removal compositions which describe as essential components, a carbonate, a dibasic ester and a monoester.

SUMMARY OF THE INVENTION

I have discovered a composition for removal of paint and varnish coating from wood, concrete or metal which is highly effective and avoids or reduces the detrimental environmental and toxicity problems heretofore encountered with stripping compositions. More particularly, this is achieved with a composition comprising a mixture of a first environmentally acceptable polar solvent having a Hansen's fractional polar solubility parameter component of greater than about 0.16 or 16%, a second environmentally acceptable polar solvent having a Hansen's fractional solubility parameter component greater than 0.25 or 25% and an activator, wherein the relative amounts of the first and second solvents are sufficient to achieve an actual efficiency of coating removal at least 10 percent greater than calculated theoretical efficiency of coating removal based on the weight fraction of each of the first and second solvents in the mixture.

Described herein is a composition in which NMP and/or BLO is replaced by a polar solvent having Hansen's fractional polar component solubility parameter greater than 0.16 or 16%, preferably greater than 0.25 or 25%, more preferably greater than 0.35 or 35%. The solvent composition should have at least one solvent having Hansen's polar solubility parameter component greater than 0.25 or 25%. The component solvents have low volatility having boiling point greater than 120° C. at atmospheric pressure. Examples of such solvents are but not limited to are: Pentanoic acid, 5-(dimethylamino)-4-methyl-5-oxo-methyl ester: propylene carbonate; N,N-dimethyl imidazolidinone (DMI); Dimethyl Sulfoxide (DMSO); Dimethyl acetamide (DMF) and benzyl alcohol. Other optional compositions such as rheology modifiers, fragrance, bittering agents, emulsifiers can be added as needed.

As used herein, the following terms have the meaning:
1. Actual efficiency of coating removal: the actual measured amount of coating removed by the applied solvent mixture;
2. Expected efficiency of coating removal: the amount of coating removal expected based on the amount of coating removal measured for each solvent when applied separately;
3. Weight fraction: the ratio of the weight of each of the first and second solvents in the mixture A method is also provided herein which is particularly effective for removing or stripping varnish and paint or stains from surfaces such as wood, or metal wherein the above described inventive composition is applied to a surface having a varnish, paint or stain thereon in an amount effective to wet or spread the coating, allowing the composition to remain on the surface for a time sufficient to loosen the coating and then removing the composition and coating from the surface.

A non-volatile component of prior art compositions comprises about 20-70% N-methyl-2-pyrrolidone, 30-80% gamma-butyrolactone and 1-30% EEP, 0.1-10% N-octyl pyrrolidone (NOP) and 0.1-5% Silwett L 77 (Ethoxylated siloxane), preferably 30-65% NMP, 35-70% BLO and 2-15% EEP, 0.2-5% NOP and) 0.2-3% Silwet L 77 and optimally, 35-39% NMP, 55-59% BLO and 3-5% EEP and 1-3% NOP and) 0.5-2% Silwet L 77. Recent literature indicates the NMP has a potential of toxicity adverse to reproduction. In the present invention, NMP is replaced with a suitable non-toxic polar solvent which does not have a toxicity problem. This is shown in the examples presented hereinbelow.

It is an object of this invention to enhance performance of an essentially non-aqueous environmentally friendly synergistic solvent mix to remove paint, varnish, and stain coatings from substrates. This objective is accomplished by including very effective wetting and spreading agents normally used for aqueous systems in small concentrations. These and other objects and features of the invention will be made apparent from the following description of the invention.

The choice of wetting and spreading components have the following criteria.
1. Solvent-surfactant in one product
2. Estimated or measured HLB less than 8, preferably less than 6
3. Efficient wetting demonstrated by Drave's wetting of cotton skein with less than 5 seconds at 0.1% in water.
4. Equilibrium surface tension less than 30 mN/M (dynes/cm) at 0.1% in water
5. Contact angle in Teflon at less than 50° with 0.1% aqueous solution
6. Solvent action on most adhesive polymers 7. Total compatibility with the pre-evaluated synergistic solvent matrix
8. Water washable on dilution
9. Desirable synergy with the chosen spreading agent
10. Spreading agent—low equilibrium surface tension as above
11. Contact angle as above
12. Synergy with the chosen wetting agent
13. Water washable on dilution
14. Total compatibility with the pre-evaluated synergistic solvent matrix The advantage of including the inventive wetting agent and/or spreading agents along with essentially non-aqueous solvent matrix is to provide efficient spreading and wetting through the pores of the coated substrates and improve speed and completeness of the coating removal. Inclusion of the inventive components would also provide efficient removal of residual solvent matrix from the substrate during the post stripping washing process.

The Inventive compositions enable:
High lifting capability of varnish/paint type coating from substrates individually or along with commercial paint stripping compositions
Easy post-stripping washability for efficient removal of the inventive components from the substrate using water or common cleaning solvents like lower alcohols like ethanol, isopropanol (methanol will work but has environmental issues)

Typical such wetting and spreading agents but not limited to are described below: NOP, Alcoxylated (ethoxylated or propoxylated long alkyl chain (>C8 preferably >C10) alcohol, Alcoxylated silicone (ethoxylated/propoxylated siloxane). Following illustrations make use of N-Octyl pyrrolidone (NOP); Nonynol ethoxylate with average 3 EO; Silwett L 77/L7001/L 7210 and combinations thereof.

DETAILED DESCRIPTION OF THE INVENTION

Typical paint and varnish remover compositions of the present invention include the following components.

The following solvents designated A-G were utilized in the examples described herein:

TABLE 1L

List of polar solvents used in the examples

A: RPG - Rhodiasolv ® Polarclean Methyl 5-(dimethylamino)-2-methyl-5-oxopentanoate or Pentanoic acid, 5-(dimethylamino)-2-methyl-5-oxo-, methyl ester CAS-No.: 1174627-68-9
B: BLO (gama butyrolactone) - CAS NO: 96-48-0
C: PC - Propylene Carbonate - CAS NO:. 108-32-7
D: DMSO (dimethyl sulfoxide) - CAS No: 67-68-5
E: DMI (dimethyl imidazolidinone) - CAS NO; 80-73-9
F: EEP (Ethyl ethoxypropionate) - CAS No: 763-69-9
G: BZA (Benzyl alcohol) - CAS No: 100-51-6

Mixtures of these solvents were also used in the below-described experiments as follows:
Binary mixtures of the above-listed solvents in ratios of (1:1) wt. ratio, a 0.3:0.7 wt. ratio, and 0.7:0.3 wt. ratio were tested. The relative efficacy of several binary optimized compositions were retested with and without 5% added EEP.

Substrate Preparation [Wood Panels]
Pine wood panels, 24 inches long, ½ inches thick, and 3 inches wide obtained from commercial sources were prepared as follows: the surfaces were cleaned with cloth, wiped with alcohol and air dried. Three coats of an alkyd enamel paint of three different colors obtained from commercial sources were applied to each panel. The thus coated panels were cured in air for 1-3 days followed curing in a laboratory oven at 50° C. for 8-24 hours.

Preliminary Screening Testing
For a preliminary screening evaluation, one drop of test formulation/solvent composition was applied at two different locations on a pre-labelled test panel. The panel was then allowed to stand for 15 and 30 minutes. The spots were then scraped and the amount of coating removal was visually examined. The results were tabulated from 0 to 3 in terms of the number of layers of paint removed, with 3 being perfect removal. The efficacy of coating removal was evaluated using a numerical index from 0-10, with 0 being no removal and 10 being complete removal of all layers of coating.

The above tests were repeated using 3 coats of a semigloss latex water-based paint and a polyurethane varnish which were air cured for 8-24 hours. The results of these tests are set forth in Tables 1 and 2 below.

Optimized Sample—Preliminary Evaluation
were air cured for 8-24 hours. Test material was applied with a disposable brush in a width of 3 inches with a 1 inch gap between coatings. A middle gap was left a as reference.

The effectiveness was measured as the percentage of the 4 coats removed after 30 minutes of stripping time after brush application of sufficient test material to cover the surface completely. The results of these tests are set forth in Table 1, 2, and 3 below.

Preliminary Screening of Individual Selected Solvents
Description of Coated Material
Panel 1: Alkyd paint—Panels with Oil Paint [indicated as Oil]:
These panels were coated with Zinsser Cover Stain Oil Base Interior/Exterior Primer (Stain Blocker-Bond Coat) White (1 coat)
2nd Coat: Rust-Oleum Safety Red Gloss (Professional) High Performance Protective Enamel
3rd Coat: Rust-Oleum Hunter Green (Professional) High Performance Protective Enamel
4th Coat: Rust-Oleum Royal Blue (Professional) High Performance Protective Enamel
Total Thickness for 4 coats was ~0.2 mm
Panel 2: Latex Semigloss [indicated as Ltx]—
1st coat: Valspar (Latex Interior) Bare Wood Primer—
$2^{nd}$ Coat: Olympic Assure (Latex Interior Semi-Gloss) Red Paint & Primer;
3rd Coat: Olympic Assure (Latex Interior Semi-Gloss) Green Paint & Primer;
4th Coat: Olympic Assure (Latex Interior Semi-Gloss) Blue Paint & Primer:
Total thickness for 4 coats was ~0.2 mm
Panel 3; Varnish Polyurethane [PU]—
$1^{st}$ Coat: MINWAX Wood Finish Penetrating Stain,
$2^{nd}$, $3^{rd}$ and $4^{th}$ coat: (heavy) MINWAX Fast Drying Polyurethane Clear Semi-Gloss Total thickness for 4 coats was ~0.15 mm
The average Coverage Area for Solvent Drops was 1 sq. cm and occasionally going up to 1.5 sq. cm

TABLE 1

Relative efficacy with select solvents Oil, Ltx, Pu (All Tables)

| Treated Panel No. | Treating Composition | % removed 15 min | % removed 30 min | Relative rating 0-10 (Oil, Ltx, Pu) | Total Score (sum) |
|---|---|---|---|---|---|
| 1/2/3 | A | 10, 10, 25 | 10, 10, 25 | 1, 1, 3 | 5 |
| 1/2/3 | B | 40, 40, 25 | 50, 75, 60 | 5, 8, 6 | 19 |
| 1/2/3 | C | 10, 25, 25 | 10, 50, 25 | 1, 5, 3 | 9 |
| 1/2/3 | D | 40, 10, 25 | 40, 10, 25 | 4, 1, 3 | 8 |
| 1/2/3 | E | 30, 40, 25 | 50, 60, 40 | 5, 6, 4 | 15 |
| 1/2/3 | F | 25, 100, X | 50, 100, X | 5, 10, X | 15+ |
| 1/2/3 | G | 25, 40, 25 | 45, 40, 25 | 4.5, 4, 2.5 | 11 |

The inventive composition may contain an ester amide selected from the group consisting of dialkyl (methyl or ethyl) amides and methyl or ethyl esters as terminal groups and a linear or branched alkyl chain with 2 to 8 carbon atoms, or arylalkyl or alicyclic or aryl moieties middle groups. Examples of such compounds include N, N dimethyl amido propyl, methyl carboxylate (3 carbon separation between amide and carboxylate moieties), 1,4 N, N dimethyl amido cyclohexyl methyl carboxylate (1,4 cyclohexyl separation between amide and carboxylate moieties), Para N,N dimethyl amido ethyl benzoate (with phenyl separation between amide and carboxylate moieties).

Compounds include N, N dimethyl amido ethyl methyl carboxylate (with 2 carbon separation between amide and carboxylate moieties)

A. Amide ester, Commercially available, RPG: Pentanoic acid, 5-(dimethylamino)-2-methyl-5-oxo-methyl ester.

B. LACTONES: gama-butyrolactone, delta Valero lactone, and alkylated gama butyrolactone.

C. CARBONATES: Cyclic carbonates with molecular weight less than 250.

D: DMSO Dialkyl sulfoxide with alkyl moiety less than 3 carbons

E: DMI: dialkyl imidazolidinone, N alkyl imidazolidinone (mono alkyl). Alkyl moiety 1, 2, or 3 Carbons.

(G): Benzyl alcohol, aryl alkyl alcohol, Phenyl or methyl/ethyl substituted phenyl alkyl (C1-C4) primary, or secondary alcohol.

(F): Activator, EEP, ethyl ethoxy propionate, Alkoxy esters, 1-4 Carbon alkoxy 2-5 Carbon, carboxylic acid, methyl or ethyl esters. Examples: methyl ethoxy valerate, methyl propoxy acetate.

TABLE 2

Relative Efficacy with Binary compositions

| Treated Panel No. | Treating Composition | % removed 15 min | % removed 30 min | Relative rating 0-10 | Total Score |
|---|---|---|---|---|---|
| 1/2/3 | A + B (1:1) | 10, 40, 25 | 10, 40, 25 | 1, 4, 3 | |
| 1/2/3 | A + B (0.3:0.7) | 10, 40, 10 | 10, 40, 40 | 1, 4, 4 | |
| 1/2/3 | A + B (0.7:0.3) | 10, 25, 25 | 10, 40, 50 | 1, 4, 5 | 10 |
| 1/2/3 | A + C (1:1) | 10, 40, 10 | 10, 40, 25 | 1, 4, 3 | |
| 1/2/3 | A + C (0.3:0.7) | 10, 30, 25 | 10, 40, 40 | 1, 4, 4 | |
| 1/2/3 | A + C (0.7:0.3) | <10, 20, 10 | 10, 40, 25 | 1, 4, 3 | |
| 1/2/3 | A + D (1:1) | 10, 30, 25 | 10, 40, 50 | 1, 4, 5 | |
| 1/2/3 | A + D (0.3:0.7) | 10, 40, 25 | 10, 40, 75 | 1, 4, 8 | 13 |
| 1/2/3 | A + D (0.7:0.3) | 10, 25, 10 | 10, 25, 50 | 1, 3, 5 | |
| 1/2/3 | A + E (1:1) | 10, 40, 50 | 10, 40, 50 | 1, 4, 5 | |
| 1/2/3 | A + E (0.3:0.7) | 10, 45, 40 | 10, 50, 50 | 1, 5, 5 | |
| 1/2/3 | A + E (0.7:0.3) | 10, 25, 25 | 10, 40, 50 | 1, 4, 5 | |
| 1/2/3 | B + C (1:1) | 5, 40, 25 | 25, 50, 50 | 3, 5, 5 | 13 |
| 1/2/3 | B + C (0.3:0.7) | 5, 30, 25 | 10, 40, 25 | 1, 4, 3 | |
| 1/2/3 | B + C (0.7:0.3) | 5, 30, 25 | 10, 60, 60 | 1, 6, 6 | |
| 1/2/3 | B + D (1:1) | 5, 50, 50 | 10, 50, 50 | 1, 5, 5 | |
| 1/2/3 | B + D (0.3:0.7) | 5, 50, 60 | 25, 50, 60 | 3, 5, 6 | |
| 1/2/3 | B + D (0.7:0.3) | 5, 50, 60 | 25, 60, 75 | 3, 6, 8 | 17 |
| 1/2/3 | B + E (1:1) | 10, 90, 50 | 60, 100, 75 | 6, 10, 8 | 24 |
| 1/2/3 | B + E (0.3:0.7) | 5, 50, 50 | 10, 50, 50 | 1, 5, 5 | |
| 1/2/3 | B + E (0.7:0.3) | 10, 5, 5 | 20, 100, 90 | 2, 10, 9 | |
| 1/2/3 | C + D (1:1) | 10, 25, 25 | 10, 40, 25 | 1, 4, 3 | |
| 1/2/3 | C + D (0.3:0.7) | 10, 40, 40 | 10, 40, 50 | 1, 4, 5 | 10 |
| 1/2/3 | C + D (0.7:0.3) | 10, 50, 25 | 10, 40, 40 | 1, 4, 4 | |
| 1/2/3 | C + E (1:1) | 10, 50, 25 | 10, 90, 40 | 1, 9, 4 | |
| 1/2/3 | C + E (0.3:0.7) | 10, 40, 50 | 10, 75, 50 | 1, 8, 5 | 14 |
| 1/2/3 | C + E (0.7:0.3) | 5, 40, 25 | 5, 40, 50 | 1, 4, 5 | |
| 1/2/3 | D + E (1:1) | 5, 40, 25 | 5, 40, 50 | 1, 4, 5 | |
| 1/2/3 | D + E (0.3:0.7) | 5, 40, 65 | 5, 45, 75 | 1, 4.5, 7.5 | 13 |
| 1/2/3 | D + E (0.7:0.3) | 5, 40, 65 | 5, 40, 75 | 1, 4, 7.5 | |
| | Additional binary compositions | | | | |
| 1/2/3 | A + G (1:1) | 10, 25, 25 | 25, 40, 25 | 2.5, 4, 2.5 | |
| 1/2/3 | A + G (0.3:0.7) | 10, 30, 25 | 40, 40, 25 | 4, 4, 2.5 | |
| 1/2/3 | A + G (0.7:0.3) | 10, 10, 25 | 10, 25, 25 | 1, 2.5, 2.5 | |

TABLE 2-continued

Relative Efficacy with Binary compositions

| Treated Panel No. | Treating Composition | % removed 15 min | % removed 30 min | Relative rating 0-10 | Total Score |
|---|---|---|---|---|---|
| 1/2/3 | B + G (1:1) | 30, 40, 25 | 55, 40, 60 | 5.5, 4, 6 | 15.5 |
| 1/2/3 | B + G (0.3:0.7) | 30, 25, 25 | 50, 40, 25 | 5, 4, 2.5 | |
| 1/2/3 | B + G (0.7:0.3) | 40, 40, 25 | 60, 40, 60 | 6, 4, 6 | |
| 1/2/3 | C + G (1:1) | 25, 50, 25 | 45, 55, 40 | 4.5, 5.5, 4 | 14 |
| 1/2/3 | C + G (0.3:0.7) | 25, 40, 25 | 50, 50, 40 | 5, 5, 4 | 14 |
| 1/2/3 | C + G (0.7:0.3) | 25, 30, 25 | 50, 50, 25 | 5, 5, 2.5 | 12.5 |
| 1/2/3 | D + G (1:1) | 25, 40, 25 | 50, 40, 40 | 5, 4, 4 | |
| 1/2/3 | D + G (0.3:0.7) | 10 10, 20 | 30, 25, 25 | 3, 2.5, 2.5 | |
| 1/2/3 | D + G (0.7:0.3) | 25, 30, 25 | 25, 30, 75 | 2.5, 3, 7.5 | |
| 1/2/3 | E + G (1:1) | 10, 25, 25 | 25, 40, 25 | 2.5, 4, 2.5 | |
| 1/2/3 | E + G (0.3:0.7) | 10, 30, 25 | 25, 45, 25 | 2.5, 4.5, 2.5 | |
| 1/2/3 | E + G (0.7:0.3) | 30, 25, 25 | 50, 50, 25 | 5, 5, 2.5 | |
| 1/2/3 | A + F (0.7:0.3) | 25, 25, 25 | 50 40, 40 | 5, 4, 4 | |
| 1/2/3 | B + F (0.7:0.3) | 50, 50, 40 | 75, 75, 90 | 7.5, 7.5, 9 | |
| 1/2/3 | C + F (0.7:0.3) | 30, 50, 25 | 45, 55, 40 | 4.5, 5.5, .5 | |
| 1/2/3 | D + F (0.7:0.3) | 50, 50, 25 | 70, 55, 50 | 7, 5.5, 5 | |
| 1/2/3 | E + F (0.7:0.3) | 55, 50, 75 | 75, 80, 75 | 7.5, 8, 7.5 | |
| 1/2/3 | G + F (0.7:0.3) | 40, 50, 25 | 55, 55, 60 | 5.5, 5.5, 6 | |

TABLE 3

Experimental Data showing synergy of components with select optimized solvent compositions

| I and II Treating Composition/ Treated Panel | | III Calculated Score, no Synergy | IV % removed 30 min | V Relative rating 0-10 | VI Total Score | VII % SYGY | IX Ex. No |
|---|---|---|---|---|---|---|---|
| I | II | | | | | | |
| 1/2/3 | A.3D.7 | 7.1 | 20, 30, 85 | 2, 3, 8.5 | 14 | 97 | 1, 2 |
| 1/2/3 | A.3D.7F | 7.5 | 50, 30, 85 | 5, 3, 8.5 | 17 | 127 | 3 |
| 1/2/3 | B1E1 | 17 | 60, 70, 75 | 6, 7, 7.5 7.5 | 20.5 | 21 | 4 |
| 1/2/3 | B1E1F | 16.9 | 85, 75, 75 | 8.5, 7.5, 7.5 | 24 | 42 | 5 |
| 1/2/3 | B.7D.3 | 15.7 | 60, 50, 8.5 | 6, 5, 8.5 | 20 | 27 | 6 |
| 1/2/3 | B.7D.3F | 15.7 | 75, 60, 85 | 7.5, 6, 8.5 | 22 | 40 | 7 |
| 1/2/3 | C.3D.7 | 8.3 | 10, 40, 10 | 1, 4, 5 | 10 | 20 | 8 |
| 1/2/3 | C.3D.7F | 8.6 | 50, 40, 50 | 5, 4, 5 | 14 | 62 | 9 |
| 1/2/3 | C:E 1:1 | 12.0 | 10, 90, 40 | 1, 9, 4 | 14 | 17 | 10 |
| 1/2/3 | C1G1 | 10 | 50, 55, 40 | 5, 5.5, 2.5 | 13 | 30 | 11 |
| 1/2/3 | D.3E.7 | 12.9 | 50, 50, 75 | 3, 4.5, 7.5 | 15 | 16 | 12 |
| 1/2/3 | D.3E.7F | 13 | 55, 40, 75 | 5.5, 4, 7.5 | 17 | 31 | 13 |

Comments regarding Table 3:
Column I: Panels used 1, 2, and 3 (see Section [0025]
Column II: Solvent composition with weight ratio (see Table 1L) [0027]
Column III: Calculated performance assuming no synergy, using Weight fraction and performance index using data from Table 1 [0027]
Column IV: experimental data expressed as % coating removed in 30 min.
Column V: Experimental data expressed as digital score fom 0-10 per panel tested
Column VI: Total digital score (maximum of 30 for 100% removal of all the coatings
Column VII: % Synergy of performance based on Actual experimental data (VI) and calculated data (III) expressed as % improvement - See model calculation on Example 3 [0031] and page 7 [0011], Items 1, 2, and 3
Column VIII: Example No relating to the data. [0031]

The following examples further illustrate the synergy obtained with the present invention:

EXAMPLE 1

Solvent A (Rhodiasolv® Polarclean Methyl 5-(dimethyl-amino)-2-methyl-5-oxopentanoate) Produced the following results:

On Panels 1/2/3 after 30 minutes removed 10%, 10% and 30% respectively. of the 4 layers of coated paint/varnish. The digital score was 1+1+3=5 out of a possible score of 30 for 100% removal of all the different coatings. Similar experiment using Solvent D (DMSO) in the place of Solvent A produced the following digital score after 30 minutes; 4,1,3=8.0

EXAMPLE 2

Example 1 was repeated using a combination of Solvents A and Solvent D (DMSO, dimethyl sulfoxide) in the wt. ratio 0.3:0.7. The corresponding digital scores on panels 1/2/3 after 30 minutes were: 2.0+3.0+8.5=13.5, showing synergy between solvent A and solvent D.

EXAMPLE 3

Example 2 was repeated using solvent composition with added activator (EEP) at 5%. The corresponding digital scores on panels 1/2/3 after 30 minutes were: 5+3+8.5=16.5, showing synergy improvement by the activator.

Illustration of Synergy (Using Weight Fraction)

Using Examples 1, 2, and 3. preferred weight concentration ratio of Solvents A and D at 0.3:0.7 with added ethyl 3-ethoxypropionate at 5% by weight.

Example 2 used solvent A and Solvent D at 3:7 weight ratio, and produced digital score: A:D=13.5 and with added EEP at 5% produced a digital score: A:D+EEP=16.5

Pure solvent A has efficiency of coating removal at: 5 out of a possible 30. See Table 1

Pure solvent D has efficiency of coating removal at: 8 out of a possible 30. See Table 1

Weight fraction of solvent A in the mixture of Solvent A and Solvent D at 0.3:0.7 is 0.3

Weight fraction of solvent D in the mixture of Solvent A and Solvent D at 0.3:0.7 is 0.7.

Use level contribution of Solvent A in the mixture is: 5×0.3=1.5

Use level contribution of Solvent D in the mixture is: 8×0.7=5.6

Total expected efficiency of the mixture with no synergy is: 1.5+5.6=7.1

Experimental result is: 13.5. See Table 3. This is an increase of 13.5−7.1=6.4 out of 7.1 expected score. or (6.4×7.1)×100=90%

Additional efficiency improvement by adding 5% EEP is 16.5 from 13.5.

EXAMPLE 4

Example 2 was repeated using combination of solvent B (BLO) with Solvent E (DMI) in the wt. ratio for solvents B and E at 1:1. The corresponding digital scores on panels 1/2/3 after 30 minutes were: 5.5+7+7.5=20, showing synergy between solvent B and solvent E. Single solvent E had a digital score of 15.

EXAMPLE 5

Example 4 was repeated using solvent composition with added activator (EEP) at 5%. The corresponding digital scores on panels 1/2/3 after 30 minutes were: 8.5+7.5+7.5=24, showing synergy improvement by the activator

EXAMPLE 6

Example 4 was repeated replacing Solvent E with Solvent D and using a wt. ratio for BLO and DMSO at: 0.7:0.3. The corresponding digital scores on panels 1/2/3 after 30 minutes were: 6+5.0+8.5=19.5, showing synergy between BLO and DMSO. Single solvent D had a digital score of: 4+1+3=8.

EXAMPLE 7

Example 6 was repeated using solvent composition with added activator (EEP) at 5%. The corresponding digital scores on panels 1/2/3 after 30 minutes were: 7.5+6+8.5=22, showing synergy improvement by the activator

EXAMPLE 8

Example 6 was repeated replacing Solvent B with Solvent C and using a wt. ratio for Propylene Carbonate (PC) and DMSO at: 0.3:0.7. The corresponding digital scores on panels 1/2/3 after 30 minutes were: 1+4+5=10 showing synergy between PC and DMSO.

EXAMPLE 9

Example 8 was repeated using solvent composition with added activator (EEP) at 5%. The corresponding digital scores on panels 1/2/3 after 30 minutes were: 5+4+5=14, showing synergy improvement by the activator

EXAMPLE 10

Example 8 was repeated replacing Solvent D with Solvent E (DMI) and using a wt. ratio for Propylene Carbonate (PC) and DMI at: 0.5:0.5. The corresponding digital scores on panels 1/2/3 after 30 minutes were: 1+9+4=14 showing synergy between PC and DMI

EXAMPLE 11

Example 2 was repeated using Solvents Benzyl alcohol and PC (Propylene Carbonate) in the wt. ratio: 1:1. The corresponding digital scores on panels 1/2/3 after 30 minutes were: 5+5.5+4=14.5, showing synergy between PC and Benzyl alcohol. Individual solvent, benzyl alcohol produced a digital score of: 4.5+4+2.5=11.

EXAMPLE 12

Example 2 was repeated using Solvents D (DMSO) and E (DMI) in the wt. ratio: 0.3:0.7. The corresponding digital scores on panels 1/2/3 after 30 minutes were: 3,4.5,7.5 3+4.5.+7.5=15, showing synergy between DMSO and DMI.

EXAMPLE 13

Example 12 was repeated using the solvent composition with added activator (EEP) at 5%. The corresponding digital scores on panels 1/2/3 after 30 minutes were: 5.5+4+7.5=17, showing synergy improvement by the activator.

EXAMPLE 14

Example 2 is repeated using three Solvents C (PC), solvent G (Benzyl alcohol) and B (BLO) in the wt. ratio: 0.4:0.4:0.2. The corresponding digital scores on panels 1/2/3 after 30 minutes are: 5+5+6=16, showing synergy between the three solvents. C, G, and B.

EXAMPLE 15

Example 14 is repeated using the solvent composition with added activator (EEP) at 5%. The corresponding digital scores on panels 1/2/3 after 30 minutes are: 6+6+6=18, showing synergy improvement by the activator

EXAMPLE 16

Example 14 is repeated using three Solvents C (PC), solvent G (Benzyl alcohol) and D (DMSO) in the wt. ratio: 0.4:0.5:0.1. The corresponding digital scores on panels 1/2/3 after 30 minutes are: 5+5+4=14, showing synergy between the three solvents. PC, Benzyl alcohol and, and DMSO.

EXAMPLE 17

Example 16 is repeated using the solvent composition with added activator (EEP) at 5%. The corresponding digital scores on panels 1/2/3 after 30 minutes are: 6+6+5=17, showing synergy improvement by the activator.

TABLE 1P

Typical Paint Stripping Compositions, Wt %

| Solvents | Polar Solvent A through E/G | Polar Solvent A through E/G | Activator (EEP) or safe penetrant | WETTING AGENT (NOP)/(ALC EO)* | SPREADING AGENT (Silwett L 77/ L 7001/L 7210)** |
|---|---|---|---|---|---|
| Essential | 20-80 | 10-90 | 1-20 | 0.1-10 | 0.1-5 |
| Suitable | 30-70 | 20-70 | 2-15 | 0.2-5 | 0.2-4 |
| Optimum | 40-60 | 30-40 | 1-5 | 0.5-3 | 0.5-3 |
| Preferred | 50-55 | 32-38 | 1-4 | 1-1.5 | 0.5-1 |

A commercial optimized wetting composition Easy wet 20 can also be used in the place of wetting agent
*Ethoxylated (3 EO) nonynol,
**Ethoxylated siloxane Third Solvent a Through E/G can Also be Added at (0-30%) by Weight Other Co-solvent and activators combinations as defined in copending application referred to hereinabove would also work. Acids/Bases/silicones can also be used as additional activators.

Optional suitable components (% by Wt.) Optimum/ Preferred are shown below:

TABLE 2P

Optional Suitable Components, Wt %

| Components | Optimum | Preferred |
|---|---|---|
| Surfactants | 0-5 | 2-3 |
| Organic acid | 0-5 | 2-3 |
| Rheology modifier | 0-2 | 0.5-1.5 |
| Flavoring Agent | 0-0.5 | 0-0.2 |
| Bittering Agent | 0-0.05 | 0.002-0.003 |
| Diluent | 0-40 | 10-30 |

As described in Table 1, the essential components of the paint and varnish remover composition of the invention include synergistic mixed solvents A-E/G (available from commercial sources) which are activated by ethyl 3-ethoxypropionate (EEP). The activator compound EEP is available from Eastman Chemicals as Ektapro® EEP solvent. The presence of EEP in the composition activates the solvents so that more effective paint and varnish removal action is achieved. Since EEP reduces the flash point of the composition, which is not desirable, it is preferred to use the lower end of the suitable range of the activating effect of EEP. NOP, ALC EO, and SILWETT L 77 are also available from commercial sources.

The composition of the present invention may contain optionally, one or more of the group of a surfactant, a thickener, a fragrance, a bittering agent and a diluent. Suitable surfactants include non-ionic surfactants with HLB ranging from about 8-18, selected from:
1. The polyethylene oxide condensates of alkylphenols, e.g., the condensation products of alkylphenols or dialkyl phenols wherein the alkyl group contains from about 6 to about 12 carbon atoms in either branched chain or particularly straight chain configuration, for example, octyl cresol, octyl phenol or nonyl phenol, with ethylene oxide, the said ethylene oxide being present in amounts equal to about 5 to about 25 moles of ethylene oxide per mole of alkylphenol.
2. Partial esters formed by the reaction of fatty acids, for example of about 8 to about 18 carbon atoms, with polyhydric alcohols, for example, glycerol, glycols, such as, mono-, di-, tetra- and hexaethyleneglycol, sorbitan, etc.; and similar compounds formed by the direct addition of varying molar ratios of ethylene oxide to the hydroxy group of fatty acids.
3. The condensation products of fatty acid partial esters with ethylene oxide, such as, fatty acid esters of polyoxyethylene sorbitan and sorbitol containing from about 3 to about 80 oxyethylene units per molecule and containing fatty acid groups having from about 8 to about 18 carbon atoms.
4. The condensation products of aliphatic alcohols having from about 8 to about 18 carbon atoms in either straight chain or branched chain configuration, for example, oleyl or cetyl alcohol, with ethylene oxide, the said ethylene oxide being present in amounts equal to about 30 to about 60 moles of ethylene oxide per mole of alcohol.

Examples of surface active agents which may be used are those supplied under the following trade names with approximate Chemical Constitution:
Antaron® monocarboxyl cocoimidazoline
Igepon® alkyl sulfoam ides
Alipal® ammonium salt of ethoxylate sulfate
Igepal® ethoxylated alkylphenol
Emulphogene® tridecyloxypoly(ethyleneoxy)ethanol
Span 40® sorbitan monopalmitate
Parasyn® hydrogenated castor oil
Miraniol® cocoamphodipropionate
Trydet® polyethoxylated fatty acid ester Suitable organic acids include but not limited to: Formic acid, Sulfonic acid (alkyl sulfonic acid), aryl sulfonic acid, alkyl/aryl phosphonic acid. It is preferred to use strong acids for most effectiveness, preferred pKa 2-3, preferably <3.

Thickeners may also be included in the inventive composition. The preferred thickeners or gelling agents are cellulose derivatives which have the property of both water and organic solvent solubility. Cellulose derivatives of this type which are of particular interest are those ether derivatives containing etherifying groups selected from hydroxyalkyl groups and groups derived therefrom, such etherifying groups containing preferably up to about 5 or 6 carbon atoms. The gelling agent may also comprise cellulose ether derivatives which, in addition to etherifying groups selected from hydroxyalkyl groups and groups derived therefrom, contain other types of etherifying groups, especially small alkyl groups of, for example, one or two carbon atoms. However, such etherifying groups generally confer properties upon the cellulose derivative which are less acceptable for the present purpose, and the gelling agent is therefore conveniently substantially restricted to cellulose ether derivatives containing etherifying groups selected from hydroxyalkyl groups and groups derived therefrom.

Etherifying groups consisting of or derived from hydroxyalkyl groups containing up to 5 carbon atoms, particularly, 2, 3 or 4 carbon atoms, are of especial value. The hydroxypropyl celluloses, for example, have been found to be of particular value in giving a substantially transparent gel system with a suitable solvent system and in imparting quite adequate thickening and film-forming properties in their own right without the need of any other agents for these purposes. Conveniently, the hydroxypropyl group in such

TABLE 3P

| SOLVENT MIX, establish synergy, to use 100% to total mass (All Percentages are % by weight) | | | | | | |
|---|---|---|---|---|---|---|
| I | II % | III % | IV % | V % | VI % | VII % |
| Solvent with $f_P \geq 0.16$ | A | B | C | D | E | G |
| Use at least two solvents | 0-90 | 0-90 | 0-90 | 0-90 | 0-90 | 0-90 |
| EEP | 3-5 | 3-5 | 3-5 | 3-5 | 3-5 | 3-5 |
| Emulphogene ® DA-630[1] | 2-3 | 2-3 | 2-3 | 2-3 | 2-3 | 2-3 |
| Oil of Wintergreen/Thymol | 0.2-0.3 | 0.2-0.3 | 0.2-0.3 | 0.2-0.3 | 0.2 0.3 | 0.2-0.3 |
| Denatonium benzoate | 0.002-0.003 | 0.002-0.003 | 0.002-0.003 | 0.002-0.003 | 0.002-0.003 | 0.002-0.003 |
| Klucel ® H | 1.15-1.35 | 1.15-1.35 | 1.15-1.35 | 1.15-1.35 | 1.15-1.35 | 1.15-1.35 |
| NOP | 1-1.5 | 1-1.5 | 1-1.5 | 1-1.5 | 1-1.5 | 1-1.5 |
| Silwett L 77/L 7001/L 7210 | 0.5-1 | 0.5-1 | 0.5-1 | 0.5-1 | 0.5-1 | 0.5-1 | celluloses is derived from isopropanol rather than n-propanol but a number of variations in structure are possible even when this is the case. Thus, not all of the free hydroxy groups of the cellulose need necessarily be substituted and, if desired, the hydroxy groups of certain hydroxypropyl groups may, in turn, be substituted by a further hydroxypropyl group (as for example, in the Klucel® materials described below). Hydroxypropyl celluloses employed in compositions according to the present invention conveniently have molecular weights in the range from about 50,000 to about 1,000,000, preferably from about 800,000 to 1,000,000.

One form of hydroxypropyl cellulose which has been used with advantage is marketed under the trade name Klucel H. Klucel® H has a similar chemical structure to Klucel® MS 3.0, which may also be used, but is of higher molecular weight, and possesses particular advantages in terms of the viscosity of its solutions. Thus, a 1% solution of Klucel® H in water has a viscosity in the range from 1,500 to 2,500 units and in ethanol the range is 1,000 to 2,500 units while solutions of Klucel® MS 3.0, particularly in ethanol, have a lower viscosity. The property of possessing a substantially similar viscosity in organic solvent and aqueous solutions is a valuable one for gelling agents used in compositions according to the present invention. The proportion of gelling agent required in the compositions in order to give good gels, depends in part on the molecular weight of the gelling agent used, the usual range being from 0.25% to 2%. Thus, for example, with the usual proportion of gelling agent of from about 0.25% or 0.5% upwards is suitable for high molecular weight materials and of from about 2% upwards is suitable for low molecular weight materials. For high molecular weight materials, for example of molecular weights of 800,000 to 1,000,000, a proportion of above 1.5% is preferably avoided as it leads to a gel of too great a viscosity. With low molecular weight materials, larger proportions may be used before such a position is reached and, if the molecular weight is low enough, amounts of up to 10% or even 20% or more may be used. It will be appreciated, however, that the use of a smaller amount of material of higher molecular weight is generally to be preferred.

A typical fragrance is oil of wintergreen (methyl salicylate) although many others known in the art may be used as well.

Suitable diluents include organic hydrocarbons such as dipentene and xylene, alkylene glycol ethers such as propylene glycol monomethyl ether, tripropylene glycol monomethyl ether, dipropylene glycol monomethyl ether and tetrahydrofurfuryl alcohol, and propylene carbonate. Mixtures of these compounds also may be used. A suitable bittering agent is denatonium benzoate although others known in the art may be used as well.

Table 3P Typical Paint Stripping Compositions Including Optional Ingredients

Representative compositions of the invention include the following Examples below:

NOP can be replaced by alcohol ethoxylates (ALCEO) or commercial Easy Wet 20 (polyoxyethylated (6) decyl alcohol)

Methodology used to determine the relative efficacy of treatment compositions was extracted from U.S. Pat. No. 5,098,592 (Incorporated herein by reference in its entirety):

In preliminary screening, one drop of test formulation was applied to 24-inch-long, ½ inch high, and 3 inch wide panels of pine wood painted liberally with 3 coats of alkyd enamel paint and cured in air for 1 week and in an oven for 2 days at 50° C. The spots containing the reagents were scrapped at 15 minute and 30 minute intervals and the relative paint stripping performance measured in terms of number of coats removed, 3 being perfect, by visual evaluation.

The efficacy test results is carried out on 12 whole panels of wood inter-painted with 4 coats of air cured paint and varnish materials for 8-24 hours. The effectiveness is measured as the percentage of the 4 coats removed after 30 minutes of stripping time with brush application of sufficient test material to cover the surface completely. The coating for the panels is as follows:

Panel 1: Glidden, acrylic latex—white,
Panel 2: Red Devil; acrylic enamel—brown,
Panel 3: Rickel Alkyd enamel—white,
Panel 4: Pittsburgh semigloss latex—white,
Panel 5: Glidden exterior gloss latex—black,
Panel 6: Rickel latex trim exterior gloss—green,
Panel 7: Modern floor deck enamel interior-exterior—brown,
Panel 8: Muralo, acrylic midgloss—white,
Panel 9: Muralo, vinyl-acrylic latex—pink,
Panel 10: Mcloskey gloss polyurethane varnish clear,
Panel 11: Red Devil, gloss polyurethane-enamel—blue,
Panel 12: Sears, interior-exterior latex enamel high gloss—purple.

While the compositions herein have been shown are formulated as solutions, it will be understood that other forms of the inventive compositions may be used as well, such as aerosol sprays, gels, lotions, creams etc.

EXAMPLES

Example 1A

Commercial paint stripping compositions, Zipstrip containing Methylene Chloride as the major component is used to strip typical 24-inch-long, ½ inch high, and 3 inch wide panels of pine wood painted with 3 coats of alkyd enamel paint/Latex semigloss paint/varnish and cured in air for 1 week and in an oven for 2 days at 50° C. as described below. A liberal amount of Zipstrip is applied by a brush and left in the hood for 15 minutes. The softened paint/varnish is removed by a scrapper. The process is repeated a second time. Average Paint removed in the first step and second step was 70% and 90-100% respectively.

Example 2A

Example 1A is repeated using the commercial stripper mixed (Zipstrip) with 10% inventive composition summarized in Table 3P, (Column III and V) using Polar solvents B and E (Example 7).

Results were better than in Example 1A. Less time is required in removing all layers of paint. No residual deposition is found. Total stripping composition required is about 20% less as measured by total weight of paint striping composition/area treated.

Example 3A

Example 1A was repeated using the commercial stripper mixed with 10% inventive composition summarized in Table 3P (Columns III and V) using Polar solvents B and D (Example 7).

Results were better than in Example 1A. Less time is required in removing all layers of paint. No residual deposition is found. Total stripping composition required is about 20% less as measured by total weight/area treated.

Example 4A

An old metal garage door [~8×7 ft] with 10+ years old paint is used to strip the paint using commercial paint stripper, Zipstrip. Half the door is treated with Zipstrip. After 15 minutes of standing, the loosened paint is stripped off, redeposited paint coating is observed. The same surface is retreated with the commercial Zipstrip, and let stand for 15 minutes. After the second treatment, II the paint is stripped off. The surface is cleaned using ethanol to wipe off. The treatment required half quart of the Zipstrip.

Example 5A

Example 4A is repeated using the untreated half of the garage door. In this experiment, Zip strip is mixed with 20% of the inventive composition summarized in Table 3P (Column III and V) using Polar solvents DMSO and BLO (Example 7). A single treatment with 15 minutes standing removed practically all the paint. The residual is washed with water. This treatment used approximately half the paint stripping composition as above compared with the commercial paint striper Zipstrip.

I claim:

1. A non-aqueous composition for removing a paint or varnish coating from wood, metal or concrete surfaces which consists essentially of a mixture of environmentally acceptable mixed polar solvents consisting essentially of a first environmentally acceptable polar solvent selected from the group consisting of an ester amide, a lactone, an organic carbonate, a dialkyl sulfoxide, an alkyl imidazolidinone, an arylalkyl alcohol, and mixtures thereof, and a second environmentally acceptable polar solvent selected from the group consisting of an ester amide, a lactone, an organic carbonate, a dialkyl sulfoxide, an alkyl imidazolidinone, an arylalkyl alcohol, and mixtures thereof, wherein each of the first and second solvents have a Hansen's fractional polar solubility parameter component of greater than about 0.16 or 16% and at least one of the first or second solvents has a Hansen's fractional polar solubility parameter component of greater than about 0.25 or 25%; an activator; and optionally one or more additional environmentally acceptable polar solvents and optionally one or more additives chosen from rheology modifiers, bittering agents, fragrance, diluents, and/or emulsifiers, wherein the relative amounts of the first and second solvents are sufficient to cause an increase in the removal of coating of at least 5 percent compared to a composition containing either of the first or second solvents alone, and wherein the composition is devoid of N-methyl pyrrolidone.

2. The composition of claim 1 wherein Hansen's fractional polar solubility parameter component of the first or second solvent is greater than about 0.25 or 25%.

3. The composition of claim 2 wherein Hansen's fractional polar solubility parameter component of the first or second solvent is greater than about 0.35 or 35%.

4. The composition of claim 1 where the first or second polar solvent is a lactone.

5. The composition of claim 1 where the first or second polar solvent is an organic carbonate.

6. The composition of claim 1 where the first or second polar solvent is a dialkyl sulfoxide.

7. The composition of claim 1 where the first or second polar solvent is a dialkyl imidazolidinone.

8. The composition of claim 1 where the first or second polar solvent is arylalkyl alcohol.

9. The composition of claim 1, wherein the activator is an alkoxyalkyl ester.

10. The composition of claim 9, where the activator is ethyl 3-ethoxypropionate at 1-30 wt. percent.

11. The composition of claim 9, wherein the activator is ethyl 3-ethoxypropionate at 2-15 wt. percent.

12. The composition of claim 9, wherein the activator is ethyl 3-ethoxypropionate at 3-5 wt. percent.

13. The composition of claim 1 consisting essentially of, about 10 to 90% by weight of an ester amide selected from the group consisting of dialkyl amides having methyl or ethyl as alkyl groups and methyl or ethyl esters as terminal groups and a linear or branched alkyl chain with 2 to 8 carbon atoms, or arylalkyl, alicyclic or aryl moieties as middle groups, about 90 to 10 percent by weight of dimethyl sulfoxide, and 1 to 30 percent by weight of ethyl 3-ethoxypropionate.

14. A method for removing a coating of paint or varnish from a wood, concrete or metal surface which comprises applying to the surface having the coating thereon the composition according to claim 1.

15. The method of claim 14 wherein Hansen's fractional polar solubility parameter component of the first or second solvent is greater than about 0.25 or 25%.

16. The method of claim 14 wherein Hansen's fractional polar solubility parameter component of the first or second solvent is greater than about 0.35 or 35%.

17. The method of claim 14 where the first or second polar solvent is a lactone.

18. The method of claim 14 where the first or second polar solvent is an organic carbonate.

19. The method of claim 14 where the first or second polar solvent is a dialkyl sulfoxide.

20. A method for removing a coating of paint or varnish from a wood, concrete or metal surface which comprises applying to the surface having the coating thereon a composition comprising a commercially available volatile solvent based stripping composition containing from about 5 to 25% by weight of the composition according to claim 1.

21. The composition of claim 1, wherein the first or second polar solvents are selected from the group consisting of methyl 5-(dimethylamino)-4-methyl-5-oxopentanoate, gamma-butyrolactone, N,N-dimethyl imidazolidinone, dimethyl sulfoxide, propylene carbonate, henzyl alcohol, and mixtures thereof.

22. The composition of claim 1, wherein the first and second polar solvents are present at about 10 to 90% by weight.

23. The composition of claim 1, wherein the first of second polar solvent is an ester amide.

* * * * *